United States Patent
Sakai

(10) Patent No.: US 7,325,644 B2
(45) Date of Patent: Feb. 5, 2008

(54) STEERING CONTROL DEVICE

(75) Inventor: Atsuo Sakai, Okazaki (JP)

(73) Assignee: JTEKT Corporation, Osaka (JP)

( * ) Notice: Subject to any disclaimer, the term of this patent is extended or adjusted under 35 U.S.C. 154(b) by 422 days.

(21) Appl. No.: 10/682,119

(22) Filed: Oct. 10, 2003

(65) Prior Publication Data

US 2004/0104066 A1  Jun. 3, 2004

(30) Foreign Application Priority Data

Oct. 11, 2002 (JP) .............................. 2002-298664

(51) Int. Cl.
*B62D 5/00* (2006.01)
*B62D 5/04* (2006.01)
*B62D 6/00* (2006.01)
*B63G 8/20* (2006.01)

(52) U.S. Cl. ..................... 180/402; 180/446; 701/41; 701/42

(58) Field of Classification Search .............. 180/402, 180/443, 446; 701/41, 42
See application file for complete search history.

(56) References Cited

U.S. PATENT DOCUMENTS

| | | | | |
|---|---|---|---|---|
| 5,022,480 A | * | 6/1991 | Inagaki et al. | 180/400 |
| 5,247,441 A | * | 9/1993 | Serizawa et al. | 701/41 |
| 5,347,458 A | * | 9/1994 | Serizawa et al. | 701/41 |
| 5,774,819 A | * | 6/1998 | Yamamoto et al. | 701/41 |
| 5,873,430 A | * | 2/1999 | Mueller et al. | 180/402 |
| 6,079,513 A | * | 6/2000 | Nishizaki et al. | 180/402 |
| 6,363,305 B1 | | 3/2002 | Kaufmann et al. | 701/41 |
| 6,527,079 B2 | * | 3/2003 | Takeuchi et al. | 180/443 |
| 6,782,968 B2 | * | 8/2004 | Sakugawa | 180/446 |
| 2004/0040781 A1 | * | 3/2004 | Fujioka et al. | 180/446 |
| 2004/0079578 A1 | * | 4/2004 | Kurishige et al. | 180/446 |

FOREIGN PATENT DOCUMENTS

| | | | |
|---|---|---|---|
| DE | 101 02 244 | | 3/2002 |
| DE | 100 53 714 | | 5/2002 |
| JP | 5-105100 | | 4/1993 |
| JP | 10-315998 | | 2/1998 |
| JP | 2001-334947 | | 12/2001 |
| JP | 2003182619 A | * | 7/2003 |
| WO | WO 02/34609 | | 5/2002 |
| WO | WO 02/060741 | | 8/2002 |

* cited by examiner

*Primary Examiner*—Lesley D. Morris
*Assistant Examiner*—Daniel Yeagley
(74) *Attorney, Agent, or Firm*—Oblon, Spivak, McClelland, Maier & Neustadt, P.C.

(57) ABSTRACT

A steering control device (200) is provided with a end-of-movement reaction force generation unit (an end reaction force control portion (20)). An end reaction force generating current $i_2$ which act as return a handle toward a straight-ahead position is rapidly generated in the vicinity of an upper and a lower limit of a vehicle wheel steering range. For example, a reaction force motor (4) may be additionally commanded using a newly generated command current $i_2$. Accordingly, an output torque of the reaction force motor (4) becomes proportional to a new command value $i_n$ of an Equation $i_n = i_1 + i_2$, where $i_1$ is a current command of a reaction force control portion (5). As a result of configuring the end-of-movement reaction force generation unit is this manner, for example, it is possible to generate a virtual contact resistance force (a steering reaction force) for a steering angle θ without causing heat build-up, or the like, of a motor, when no physical limit (an end-of-movement of contact point) is provided for a rotation range of a steering wheel (handle).

6 Claims, 12 Drawing Sheets

STEERING CONTROL DEVICE

INCORPORATION BY REFERENCE

The disclosure of Japanese Patent Application No. 2002-298664 filed on Oct. 11, 2002 including the specification, drawings and abstract is incorporated herein by reference in its entirety.

BACKGROUND OF THE INVENTION

1. Field of the Invention

The present invention relates to a steering control device that is provided with a steering wheel steering mechanism having a steering actuator that imparts a steering reaction force to a steering wheel, and a vehicle wheel steering mechanism having a vehicle wheel steering actuator that drives a vehicle wheel steering shaft.

The present invention can be effectively applied to various types of steering control device that are mounted in a vehicle, such as, for example, a so-called steer-by-wire system or a so-called variable gear ratio system.

2. Description of the Related Art

As an example of a conventional steer-by-wire system, art such as that disclosed in Patent Document 1 and Patent Document 2 detailed below are widely known.

FIG. 12 is a control block diagram that indicates a control method of a steering control device 900 that is a conventional steer-by-wire system.

A steering wheel steering mechanism of this steering control device 900 is fundamentally configured from a steering wheel shaft 14 disconnected from a vehicle wheel steering shaft 8; a handle (steering wheel) 1; a torque sensor (steering torque sensor) 3; a reaction force motor (steering actuator) 4; a reaction force control portion 5, as well as other members.

The reaction force control portion 5 and a position control portion 10A may be respectively configured from single processing devices (control devices), or alternatively, they may be configured from a single processing device (control device) that executes two control programs. Moreover, respective motor drive circuits, not shown, that respectively drive the reaction force motor 4 and a vehicle wheel steering motor 6, may be attached to each of the motors 4 and 6, or may be attached to the respective processing devices (control devices). Accordingly, the configuration of the above structure may, generally speaking, be selectively chosen.

The reaction force control portion 5 determines a command current in for the reaction force motor 4 based on a command current $I_n$ for the vehicle wheel steering motor 6 that is determined by a predetermined feedback control (hereinafter referred to as "position control A") executed by the position control portion 10A, and a steering torque τ output by the torque sensor 3. As a result, an optimal steering reaction force is generated.

Moreover, a vehicle wheel steering mechanism of the steering control device 900 is fundamentally configured from a steering angle sensor (steering wheel angle sensor) 2; a position sensor (steering change amount sensor) 7, and a tire 9, as well as the aforementioned position control portion 10A for executing the position control A, the vehicle wheel steering motor (vehicle wheel steering actuator) 6, and the vehicle wheel steering shaft 8.

FIG. 13 is a control block diagram that indicates a control method of the position control portion 10A of the conventional steering control device 900 described above. A command value $X_n$ of a steering change amount of the vehicle wheel steering shaft 8 is determined so as to be substantially proportional to a steering angle θ, by a steering change amount command value calculation portion 11A for executing the position control A. A PID control portion 12 determines the command current $I_n$ for the vehicle wheel steering motor 6 based on the steering change amount command value $X_n$ and an detected value $X_a$ of the steering change amount, using a known PID control. Thus, the direction of the tire 9 is controlled to a desired direction by execution of the position control A.

With the above control method, if, for example, the steering change, amount command value $X_n$ exceeds an actual physical end-of-movement position ($\pm X_E$) of the vehicle wheel steering shaft 8 due to execution of a large steering operation, the value of the command current $I_n$ is rapidly increased in accordance with the exceeded amount. At this time, an output torque (a steering reaction force) of the reaction force motor 4 is also rapidly increased due to operation of the reaction force control portion 5. Accordingly, for example, when no physical limit is established for a rotation range (an end-of-movement or contact point) of the handle 1, the above configuration acts so as to spontaneously establish (simulate) a virtual end-of-movement for a steering range.

In other words, with the conventional control method like that described above, when, for example, no physical limit is established for the rotation range (the end-of-movement or contact point) of the handle 1, the configuration is effective in generating a virtual contact resistance force (steering reaction force) corresponding to the end-of-movement of the vehicle wheel steering shaft 8, and thus the steering angle θ is inhibited from exceeding threshold values derived from a predetermined permissible range of the steering angle $\theta(-\theta_E \leq \theta \leq \theta_E)$.

(Patent Document 1) Japanese Patent Laid-Open Publication No. 2001-334947 (Paragraphs 4 and 5, FIG. 1)

(Patent Document 2) Japanese Patent Laid-Open Publication No. Hei. 05-105100 (Paragraphs 2 to 4, FIGS. 1 to 3)

However, with the aforementioned conventional method, the virtual contact resistance force (steering reaction force) in the vicinity of the end-of movement of the predetermined steering range is generated by increase of the command value $X_n$ along with the steering angle θ, in accordance with the steering change amount $X_a$ that is mechanically fixed by a physical end point. Accordingly, on some occasions, the command current $I_n$ for the vehicle wheel steering motor 6 becomes extremely large. If this state continues for a long duration, heat build-up or damage of the vehicle wheel steering motor 6 sometimes occurs.

As a result of this problem, in the case of the conventional method, compact and lightweight manufacture of the vehicle wheel steering actuator (the vehicle wheel steering motor 6) is hindered, and thus when the above described conventional method is adopted, vehicle manufacturing cost, vehicle design flexibility, and ease of vehicle maneuver, and the like, are all disadvantageously affected.

FIG. 1 is a control block diagram showing a control method of a steering control device 100 having a heat build-up inhibition function that has been proposed in order to address heat build-up problems like that described above. A position control method of the vehicle wheel steering shaft 8 of this steering control device 100 is slightly different to that of the position control portion 10A of the aforementioned steering control device 900.

More specifically, a position control portion 10B in FIG. 1 is configured using a steering change amount command value calculation portion 11B, as shown in FIG. 2, instead of by the steering change amount command value calculation portion 11A shown in FIG. 13. Position control (position control B) of the vehicle wheel steering shaft 8 is executed as a result of operations of this steering change amount command value calculation portion 11B and the PID control portion 12. It should be noted that the PID control portion 12 and the other structural members shown in FIG. 13 are used without modification.

FIG. 2 is a graph illustrating a calculation method of the steering change amount command value calculation portion 11B of the steering control device 100. In this graph, $\pm X_E$ indicates a permissible range of a steering change amount. $\pm X_E$ is set in accordance with the limits of the change amount of the actual vehicle wheel steering shaft 8. In this way, for example, if the upper and lower limits of the command value $X_n$ of the steering change amount are fixed with a guard that uses a limiter, or the like, the command current $I_n$ for the vehicle wheel steering motor 6 can be inhibited from becoming excessive, and the aforementioned heat build-up problem is addressed.

However, if processing is executed with a guard of this type, the output torque (the steering reaction force) of the reaction force motor 4 is also restricted due to the operations of the PID control portion 12 and the reaction force control portion 5. Accordingly, generation (simulation) of the virtual end-of-movement for the steering range, as in the case of the steering control device 900 of FIG. 12, ceases to occur.

Moreover, generation of the contact counter force (the steering reaction force) as with the steering control device 900 also ceases. As a result, a handle degree of play that the handle 1 can easily enter becomes present as shown by the hatched portion of FIG. 2. When the steering angle θ enters this handle degree of play, linear steering feeling and responsiveness of steering control is lost.

SUMMARY OF THE INVENTION

The present invention has been designed to address the above problems. It is an object of the present invention to provide a steering control device in which a virtual contact resistance force (a steering reaction force) is generated for a steering angle θ without causing heat build-up, or the like, of a motor, when no physical limit (an end-of-movement or contact point) is provided for a rotation range of a steering wheel (handle).

The following methods are effective in order to address the above described problems.

First, according to a first aspect of the present invention, a steering control device includes a steering wheel steering mechanism having a steering actuator that imparts a steering reaction force to a steering wheel, and a vehicle wheel steering mechanism having a vehicle wheel steering actuator that drives a vehicle wheel steering shaft. This steering control device is provided with a steering angle sensor that detects a steering angle θ of the steering wheel; and a steering change amount sensor that detects a steering change amount $X_a$ in the vehicle wheel steering mechanism. Moreover, the steering wheel steering mechanism includes an end-of-movement reaction force generation unit that respectively generates, in a vicinity of an upper limit point $θ_E$ of the steering angle θ and a vicinity of a lower limit point $-θ_E$ of the steering angle θ, a virtual contact resistance force that inhibits the steering angle θ from exceeding the threshold values of a predetermined permissible range $(-θ_E \leq θ \leq θ_E)$ of the steering angle θ, based on the steering angle θ, the steering change amount $X_a$ or a command value $X_n$ for the steering change amount $X_a$.

It should be noted that the aforementioned steering actuator is not limited to being a reaction force motor of a steer-by-wire system.

The aforementioned virtual contract resistance force is generated based on the steering angle θ, the steering change amount $X_a$, or the command current $X_n$. Accordingly, by adopting the aforementioned configuration, it is possible to output the virtual contact resistance force from the steering actuator (the reaction force motor) without making the command value for the vehicle wheel steering actuator (a vehicle wheel steering motor) excessive.

As a result, according to the present invention, it is possible to generate the virtual contact resistance force (the steering reaction force) for the steering angle θ without causing heat build-up of the motor, and the like, even when no physical limit is established for a rotation range (an end-of-movement or contact point) of the steering wheel (hereinafter also referred to as "handle").

As noted before, the aforementioned steering actuator is not limited to being the reaction force motor of the steer-by-wire system. For example, the above described configuration may be adopted in a steering control device, such as a conventional power steering device, in which a steering wheel steering mechanism and a vehicle wheel steering mechanism are mechanically connected.

As a result, according to the present invention, it is possible to generate the virtual contact resistance force (the steering reaction force) for the steering angle θ $(-θ_E \leq θ \leq θ_E)$ without causing heat build-up of the motor, and the like, even when no physical limit is established for the rotation range (the end-of-movement or contact point) of the handle.

In addition, the first aspect of the present invention may be configured such that the steering wheel steering mechanism and the vehicle wheel steering mechanism are mechanically separate, and are operationally connected by an electronic mechanism rather than by a mechanical connection.

Recently, it is mainstream for the fundamental structure of the steer-by-wire system to incorporate a steering wheel steering mechanism having a steering actuator that imparts a steering reaction force to a steering wheel, and a vehicle wheel steering mechanism having a vehicle wheel steering actuator that drives a vehicle wheel steering shaft. Further, it is also mainstream for this steer-by-wire system to be provided with a steering angle sensor that detects the steering angle θ of the steering wheel; a steering torque sensor that detects a steering torque τ applied to the steering wheel by a driver; and a steering change amount sensor that detects a steering change amount $X_a$ of the vehicle wheel steering mechanism. This fundamental structure is expected to remain predominant in the future.

According to this configuration of the first aspect, in contrast to the fundamental structure of the present generally-used steer-by-wire system, the operation and effects of the present invention can be attained by, for example, simply providing a limiter (a steering change amount command calculation portion 11B) and the aforementioned end-of-movement reaction force unit, as shown in FIG. 2, and other figures. In other words, if the control mechanism of the present invention is adopted, it is possible to add a desirable and extremely cost-effective problem solving mechanism (i.e., the end-of-movement reaction force generation mechanism) to the fundamental structure of the present generally-used steer-by-wire system.

Moreover, the first aspect of the present invention may also be provided with a steering angle threshold value variation unit that dynamically changes the upper limit point $\theta_E$ of the permissible range $(-\theta_E \leq \theta \leq \theta_E)$, based on a vehicle speed v.

By adopting a configuration of this type, if, for example, the steering angle range is restricted to a small range, and a gear ratio (i.e., a vehicle wheel steering amount divided by a steering wheel steering amount) is set to be small during high speed running, excessive or sudden steering is inhibited in advance at high speeds. Accordingly, it is possible to realize a steering sensation that imparts a sense of ease to the driver in a stable manner.

In addition, when executing steering operations such as parking in a parking lot or garage, or the like, that tend to be executed at very low speeds, if the steering angle range is restricted to a small range, and the ratio of the vehicle wheel steering amount with respect to the steering wheel steering amount is set to be large, it is possible to achieve a large degree of vehicle wheel steering with a small steering operation of the steering wheel (handle). Accordingly, for example, this type of method is highly beneficial for reducing, etc., the steering (handle) operation amount when parking, or the like.

Moreover, the first aspect of the present invention may be provided with a steering change amount threshold value variation unit that dynamically changes respective upper and lower limits of a permissible range $(-X_E \leq X_n \leq X_E)$ of the command value $X_n$, based on the vehicle speed v.

To consider an example, with the exception of special or very difficult steering situations such as when executing stunt driving, and the like, on snowy roads or ice, it is difficult to think of steering situations in which large steering operations are executed at high speed. Moreover, it is generally thought to be safer if the vehicle wheel steering amount is limited to some degree when driving at high speed. As a result, according to the above described configuration, it is possible to ensure that, for example, vehicle behavior that accompanies the execution of steering operations when driving at high speeds is safe and stable.

In addition, the first aspect of the present invention may further include a vehicle wheel steering limiter for inhibiting or preventing a command value for the vehicle wheel steering actuator from exceeding threshold values, this vehicle wheel steering limiter being configured from a steering angle limiter for inhibiting the steering angle $\theta$ (a detected value) from exceeding threshold values.

If such a limiter for the detected value is positioned between the steering angle sensor 2 and the position control portion 10B of FIG. 1, it is no longer necessary to use the limiter (the steering change amount command value calculation portion 11B) of FIG. 2 instead of the steering change amount command value calculation portion 11A of FIG. 13. This configuration is, for example, particularly useful when the end-of-movement reaction force generation unit generates the virtual contact resistance force based on the steering angle $\theta$.

Moreover, the first aspect of the present invention may include the vehicle wheel steering limiter for inhibiting or preventing the command value for the vehicle wheel steering actuator from exceeding threshold values, this vehicle wheel steering limiter being configured from a position command limiter for inhibiting the command value $X_n$ from exceeding the respective threshold values.

As an example of this type of configuration, a configuration can be proposed in which the aforementioned vehicle wheel steering limiter is configured, for example, from the position command limiter (the steering change amount command value calculation portion 11B). Of course, when this type of configuration is adopted, it is still possible to concretely realize the invention.

According to the above described first aspect of the present invention and its various configurations it is possible to effectively and rationally address the previously described problems.

DETAILED DESCRIPTION OF THE PREFERRED EMBODIMENTS

Hereinafter, the present invention will be explained with reference to concrete embodiments. However, it should be noted that the present invention is in no way limited to these described embodiments.

First Embodiment

Figure 1:
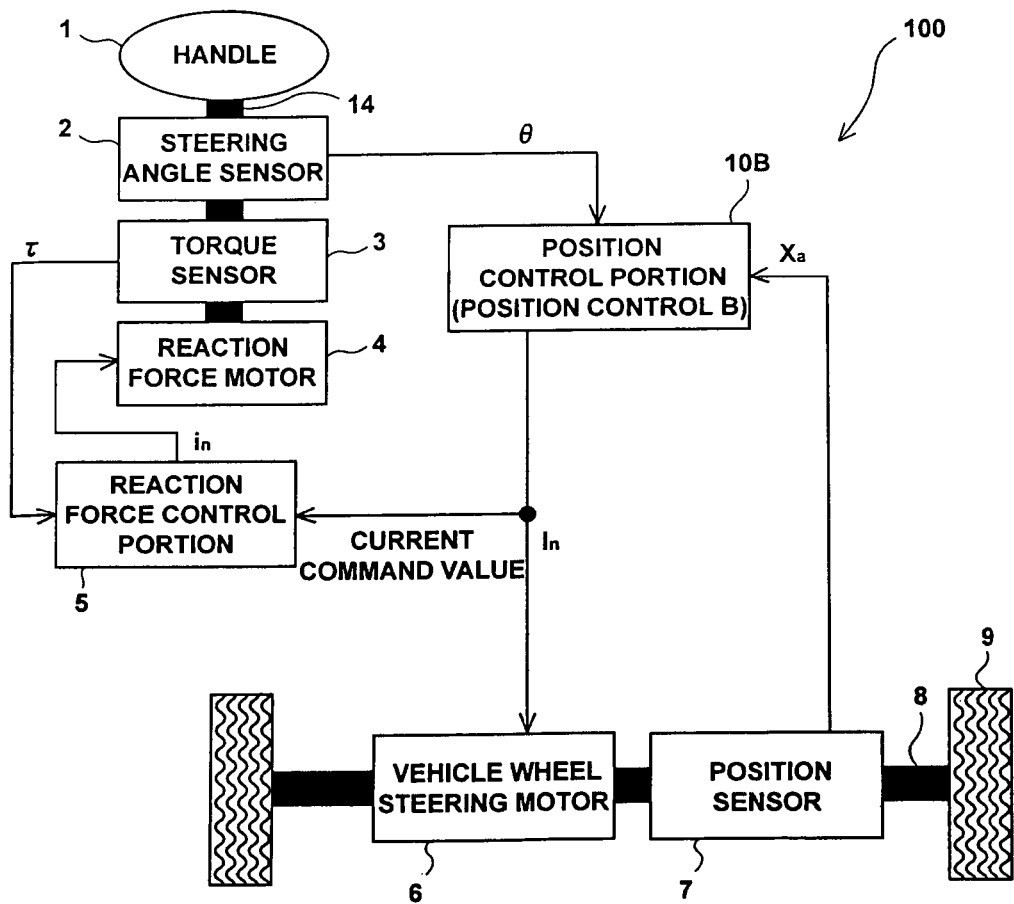
FIG. 1 is a control block diagram showing a control method of a steering control device 100 having a heat build-up prevention function.
Figure 2:
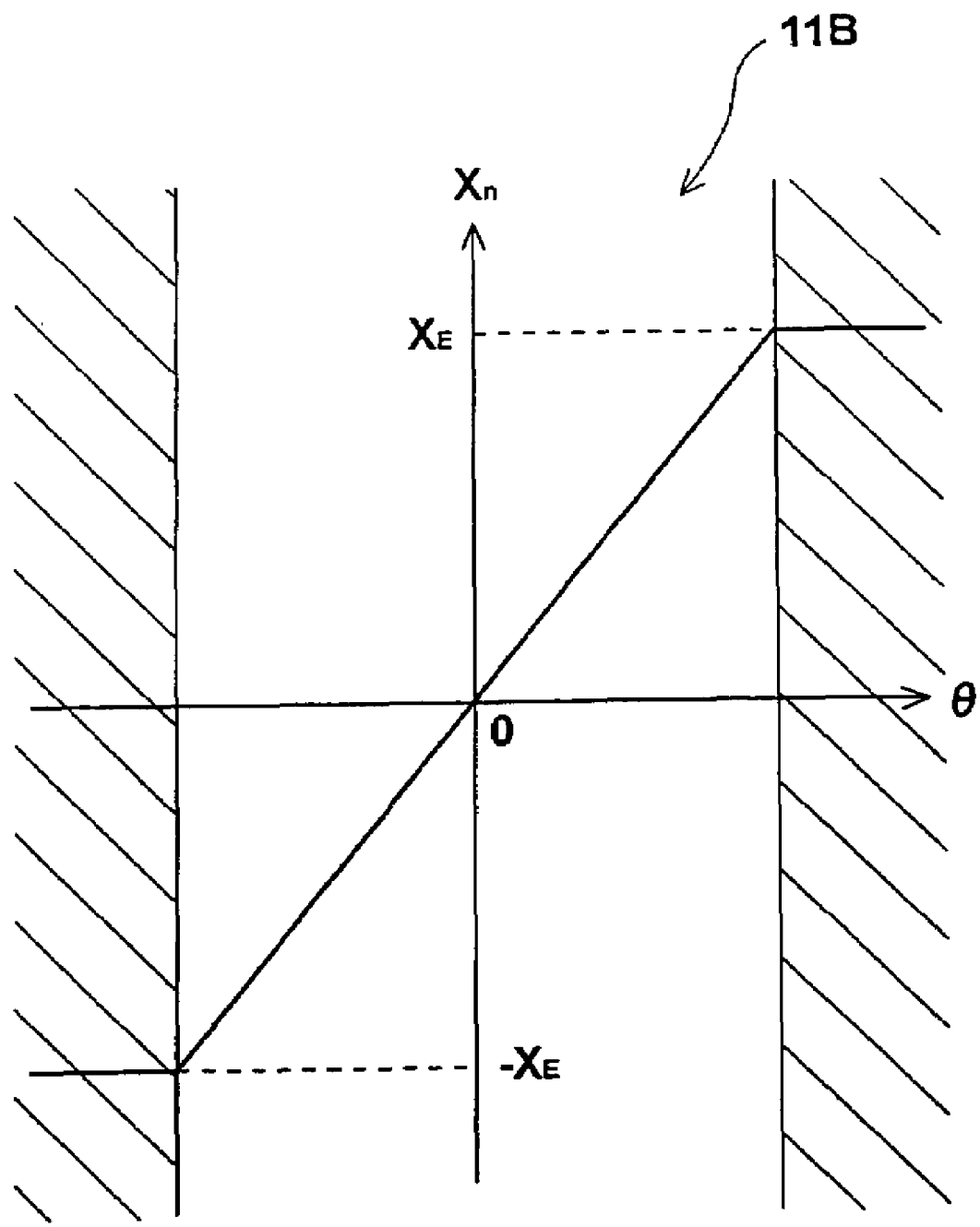
FIG. 2 is a graph illustrating a calculation method of a steering change amount command value calculation portion 11B of the steering control device 100.
Figure 3:
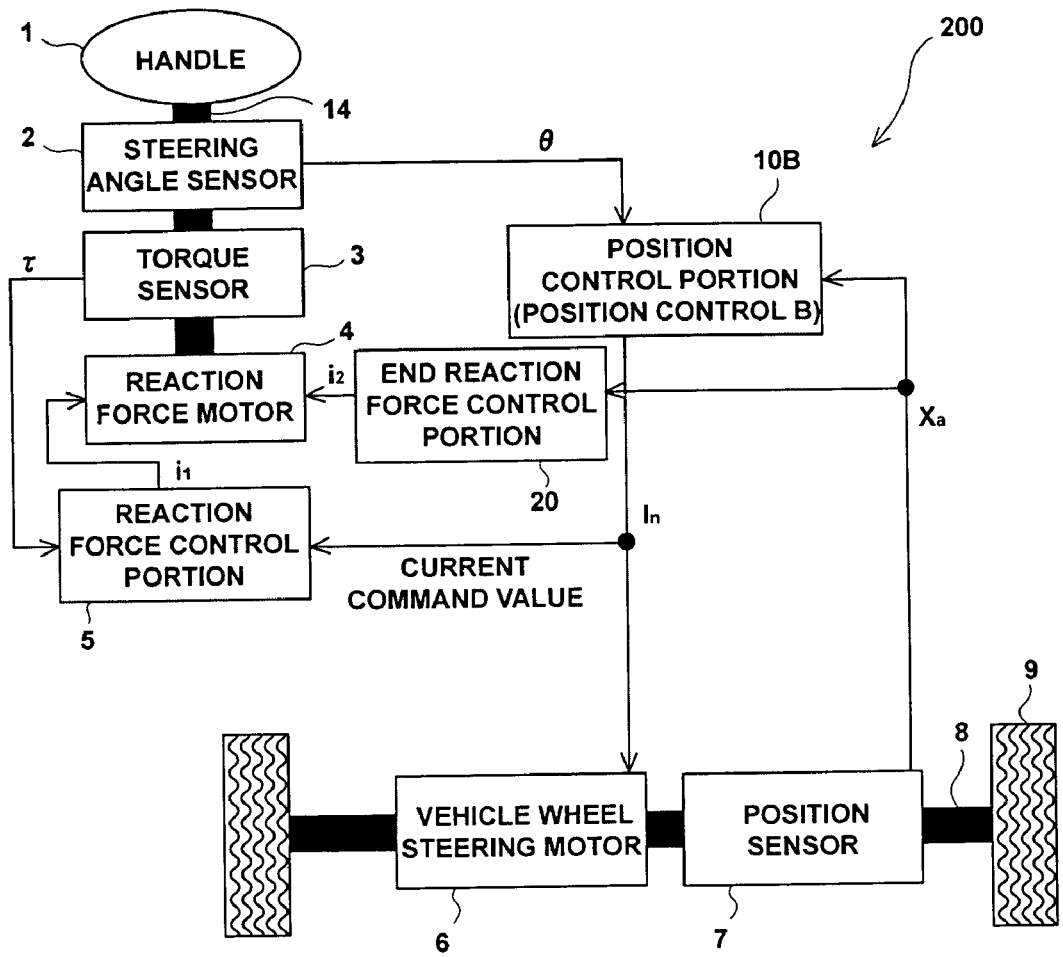
FIG. 3 is a control block diagram showing a control method of a steering control device 200 according to a first embodiment of the present invention.

FIG. 3 is a control block diagram showing a control method of a steering control device 200 of a first embodiment of the present invention. In this steering control device 200, like the previously described steering control device 100, the position control portion 10B of FIG. 1 is configured using the steering change amount command value calculation portion 11B of FIG. 2, instead of by the steering change amount command value calculation portion 11A of FIG. 13. The position control (the position control B) of the vehicle wheel steering shaft 8 is executed by operations of the steering change amount command value calculation portion 11B and the PID control portion 12.

Figure 12:
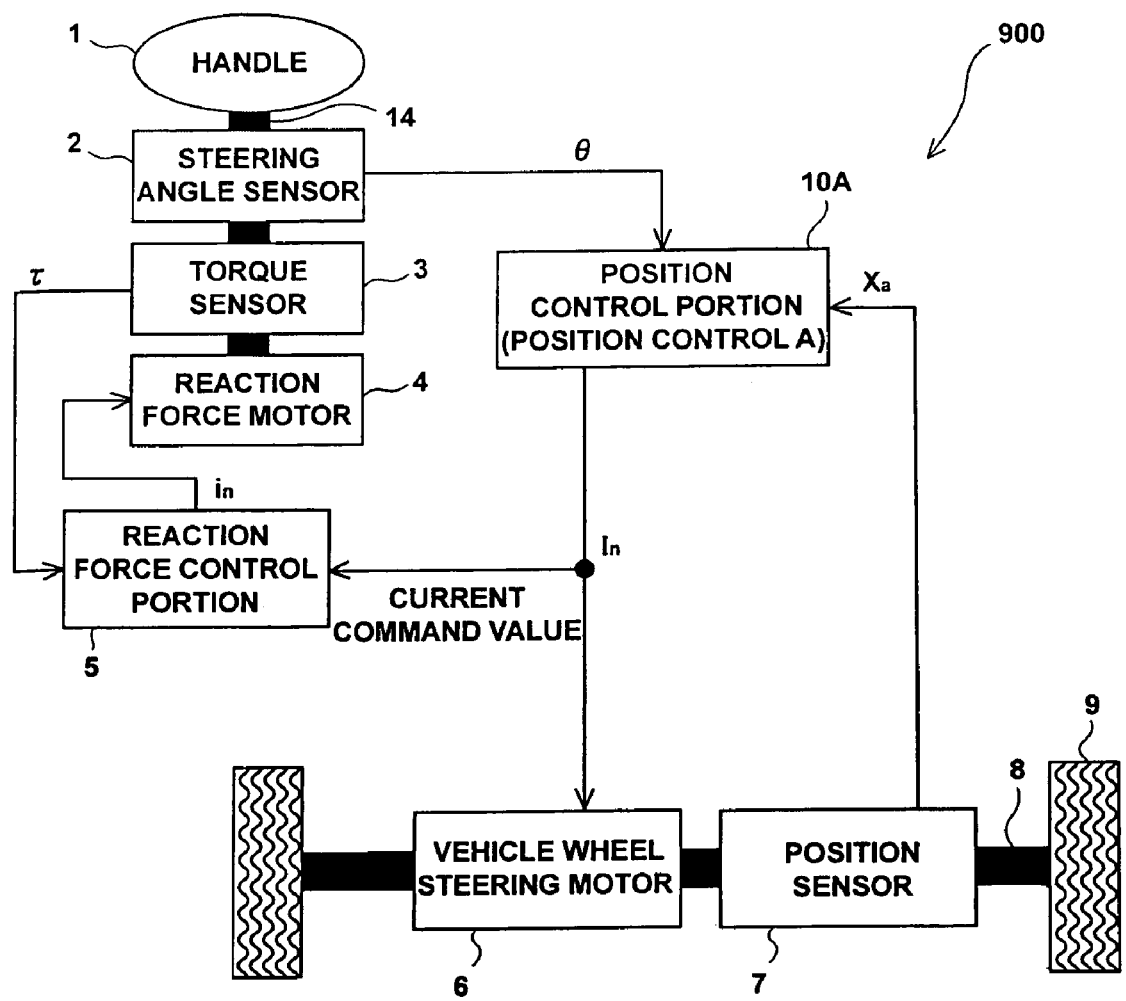
FIG. 12 is a control block diagram showing a control method of a conventional steering control device 900.
Figure 13:
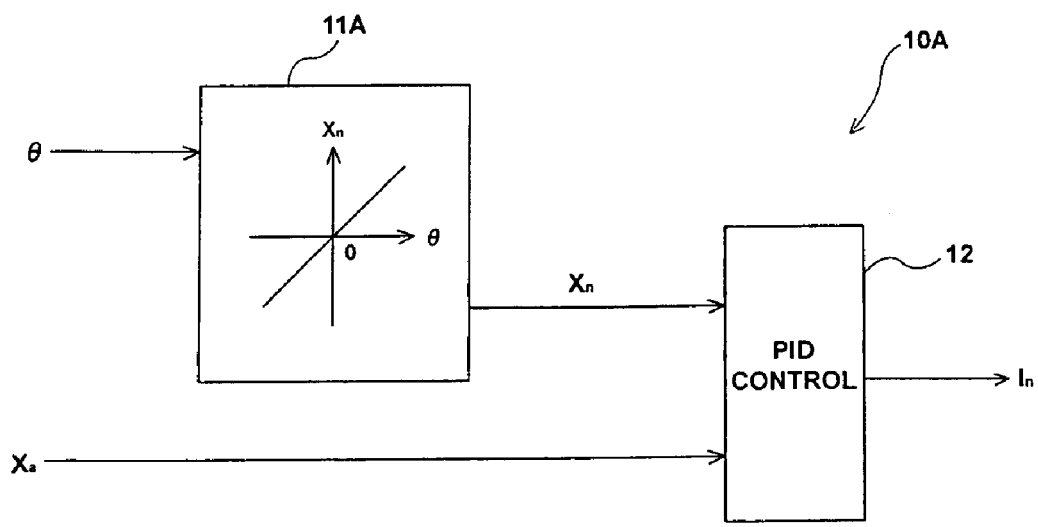
FIG. 13 is a control block diagram showing a control method of a position control A (a position control portion 10A) of the conventional steering control device 900.

As stated previously, the position control portion 10B of the steering control device 200 (FIG. 3), like the steering control device 100, is configured from the steering change amount command value calculation portion 11B of FIG. 2, instead of by the steering change amount command value calculation portion 11A of FIG. 13. In addition, a predetermined feedback control (position control B) of the vehicle wheel steering shaft 8 is executed by operations of the steering change amount command value calculation portion 11B and the PID control portion 12 (FIG. 13). However, the PID control portion 12 and the other members previously described in FIG. 12 are used without modification.

Moreover, a calculation method of the steering change amount command value calculation portion 11B of the position control portion 10B (FIG. 3) is the same as that of the steering control device 100. The $\pm X_E$ of the graph indicates the permissible range of the steering change amount. The upper and lower limits are set in accordance with the limits of the change amount of the actual vehicle wheel steering shaft 8. In this way, for example, if the upper and lower limits of the command value $X_n$ of the steering change amount are fixed with a guard that uses a limiter, or the like, the command current $I_n$ for the vehicle wheel steering motor 6 can be inhibited from becoming excessive, and the aforementioned heat build-up problem is addressed. In this time, the steering change amount command value calculation portion 11B is corresponding to the vehicle steering limiter.

Moreover, this steering control device 200 is provided with an end-of-movement reaction force generation unit (an end reaction force control portion 20), which is the most significant characterizing portion of the present invention. In this regard, the steering control device 200 is wholly different to the steering control device 100.

The reaction force control portion 5, the position control portion 10A, and the end-of-movement reaction force generation unit (the end reaction force control portion 20) may be respectively configured from single processing devices (control devices), or alternatively, may be configured from a single processing device (control device) that executes three control programs. Moreover, respective motor drive circuits, not shown, that respectively drive the reaction force motor 4 and the vehicle wheel steering motor 6, may be attached to each of the motors 4 and 6, or may be attached to the respective processing devices (control devices). Accordingly, the configuration of the above device structure maybe selectively chosen.

Figure 4:
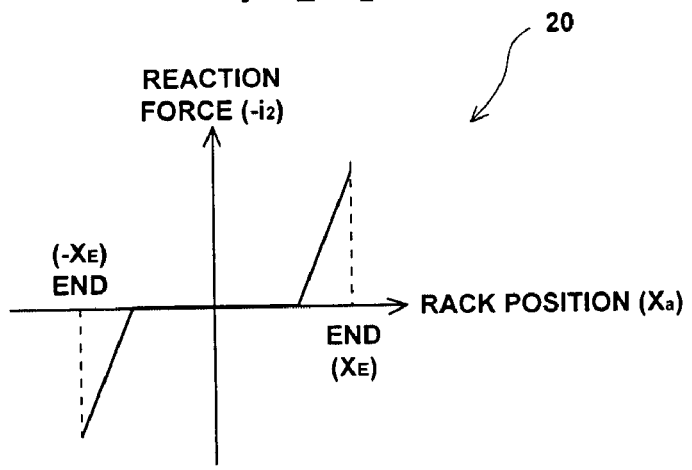
FIG. 4 is a graph illustrating a calculation method for an end reaction force $(-i_2)$ of an end-of-movement reaction force generation unit (an end reaction force control portion 20) of the steering control device 200.

FIG. 4 shows an example of a calculation method of an end reaction force ($-i_2$) of the end-of-movement reaction force generation unit (the end reaction force control portion 20) of the steering control device 200.

As an example, a command current $i_2$ acting in the opposite direction to the steering angle θ may be newly generated. By additionally controlling the reaction force motor 4 using the new command current $i_2$, the output torque of the reaction force motor 4 becomes proportional to a new command value $i_n$, of Equation 1 below:

$$i_n = i_1 + i_2 \quad \text{(Equation 1)}$$

where, $i_1$ is a current command (conventional amount) from the reaction force control portion 5; and $i_2$ is a current command (an end reaction force generating current) from the end reaction force control portion 20.

By configuring the end-of-movement reaction force generation unit like this, for example, the end reaction force generating current $i_2$ is rapidly generated in the vicinity of the upper and lower limits of the steering range, so as to return the handle 1 toward the straight-ahead position. Accordingly, by generating virtual contact resistance force (the steering reaction force), it is possible to restrict the range of steering angle without causing heat build-up of the motor, and the like, even when no physical limit is established for the rotation range (the end-of-movement or contact point) of the handle 1.

Second Embodiment

Figure 5:
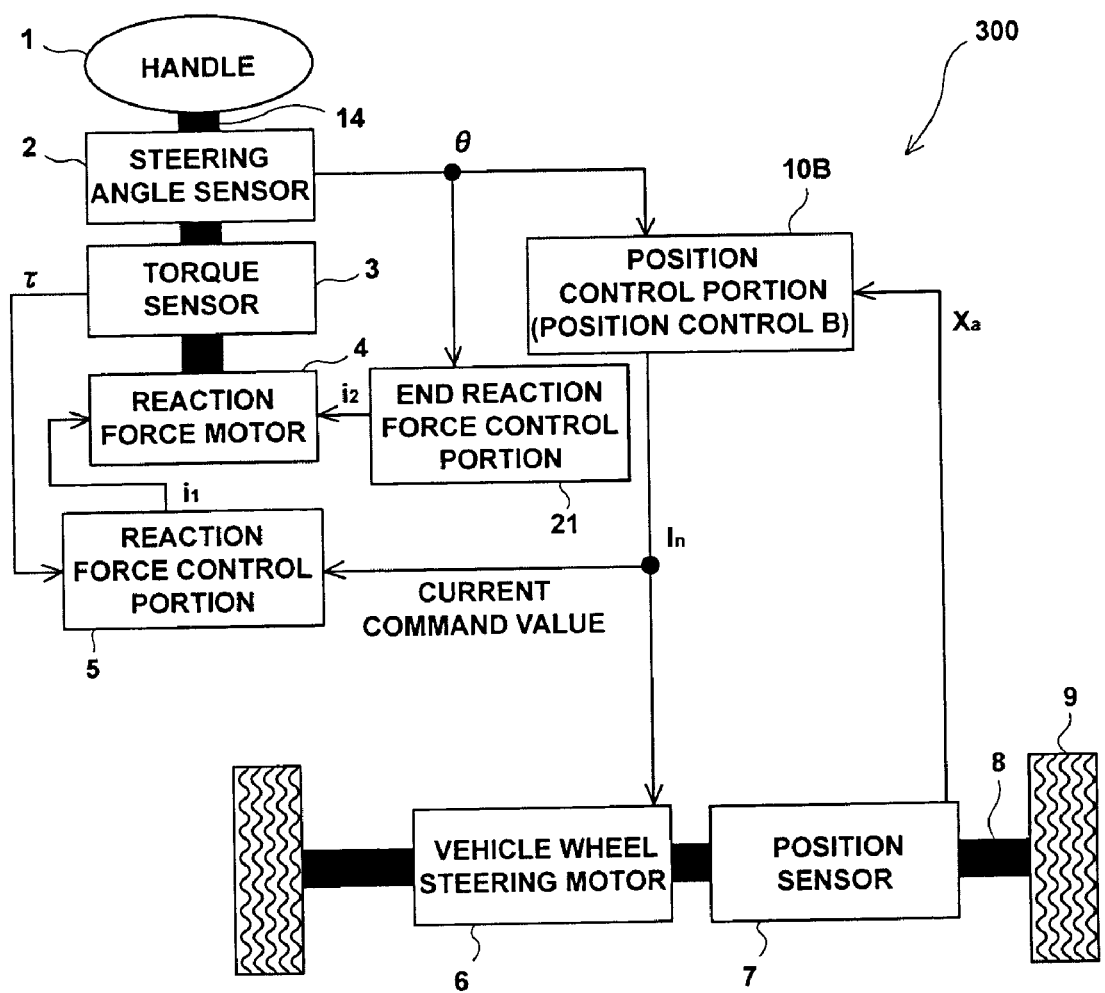
FIG. 5 is a control block diagram showing a control method of a steering control device 300 according to a second embodiment of the present invention.

FIG. 5 is a control block diagram showing a control method of a steering control device 300 of a second embodiment of the present invention. This steering control device 300 is configured by making a number of modifications to the structure of the steering control device 200 of the first embodiment. It should be noted that, fundamentally, structural members that are not specifically referred to below have the same structure as equivalent members of the steering control device 200.

Hereinafter, a detailed explanation will be given of the structure, control procedure, operation, effects, and the like, of the steering control device 300 of the second embodiment; the characterizing portions of the steering control device 300 will be focused on in this explanation.

The steering control device 300 of the second embodiment most significantly differs from the steering control device 200 with respect to the fact that, as the end-of-movement reaction force generation unit, the end reaction force control portion 20 (FIGS. 3 and 4) of the steering control device 200 of the first embodiment is replaced with an end reaction force control portion 21 (FIG. 5) that directly generates an end-of-movement reaction force from the steering angle θ.

Hereinafter, an explanation will be given concerning a specific control procedure for the steering control device 300, in the case that the reaction force control portion 5, the position control portion 10B, and the end reaction force control portion 21 (the end-of-movement reaction force generation unit) are configured as a single processing device (control device) that executes three control programs.

Figure 6:
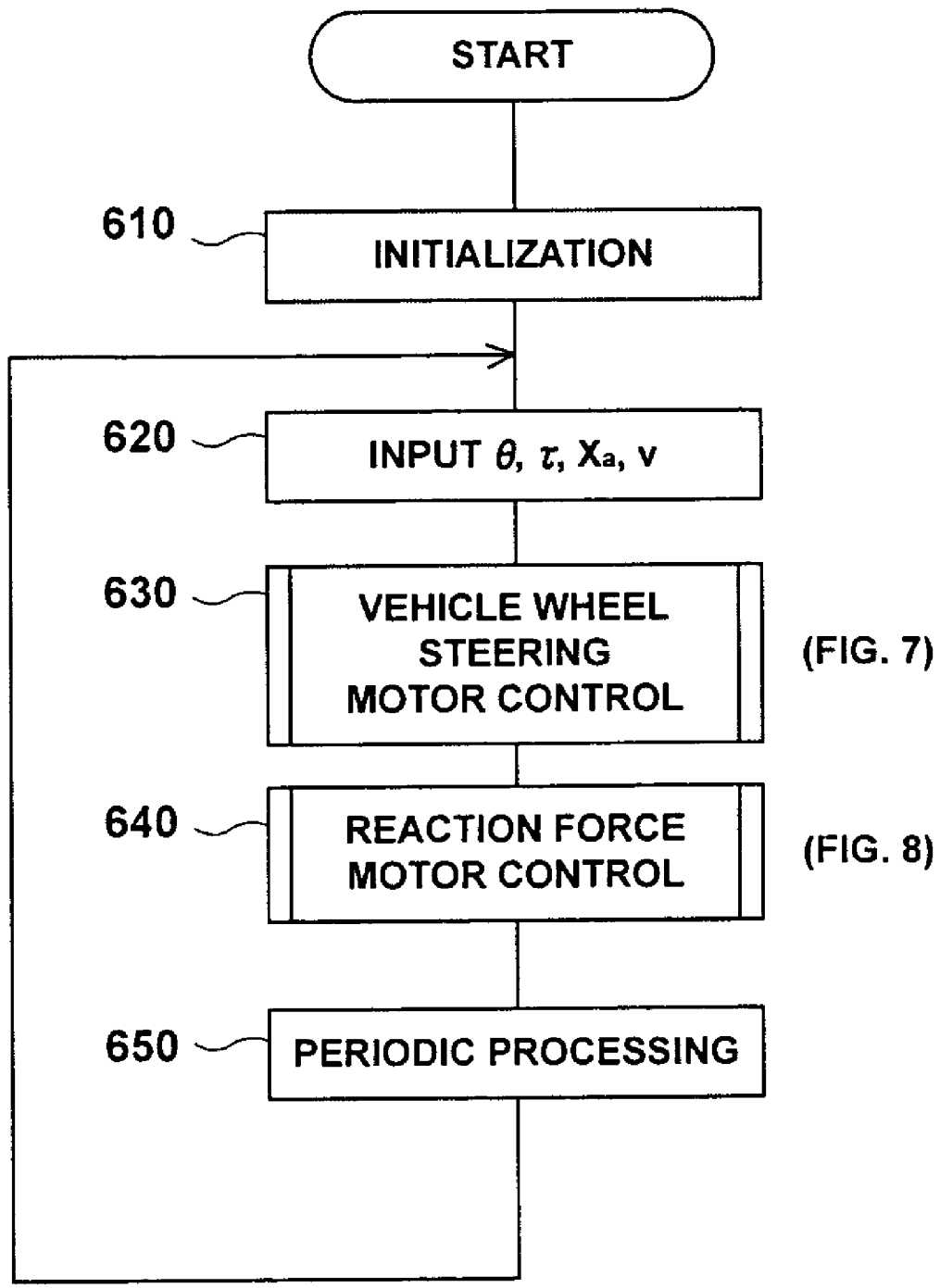
FIG. 6 is a flow chart showing a control procedure of the steering control device 300 according to the second embodiment of the present invention.

FIG. 6 is a flow chart showing a control procedure of the steering control device 300 of the second embodiment.

In this control procedure for the steering control device 300, first, in step S610, system initialization is executed. This initialization centers on processing such as initialization of control variables, and initialization of a timer interrupt control that is necessary for periodic repeated processing.

Next, in step S620, respective determination results (the steering angle θ, the steering torque τ, the steering change amount $X_a$, a vehicle speed v, etc.) from the steering angle sensor 2, the steering torque sensor 3, the steering change amount sensor 7, and various types of sensors, such as a speed sensor, not shown, are input to the position control portion 10B, the reaction force control portion 5 and the end reaction force control portion 20 as required.

In step S630, a sub-routine (FIG. 7) that executes a vehicle wheel steering motor control is called and executed. This sub-routine is a sub-routine that embodies the position control portion 10B, shown in FIG. 5, for executing the position control B.

Figure 7:
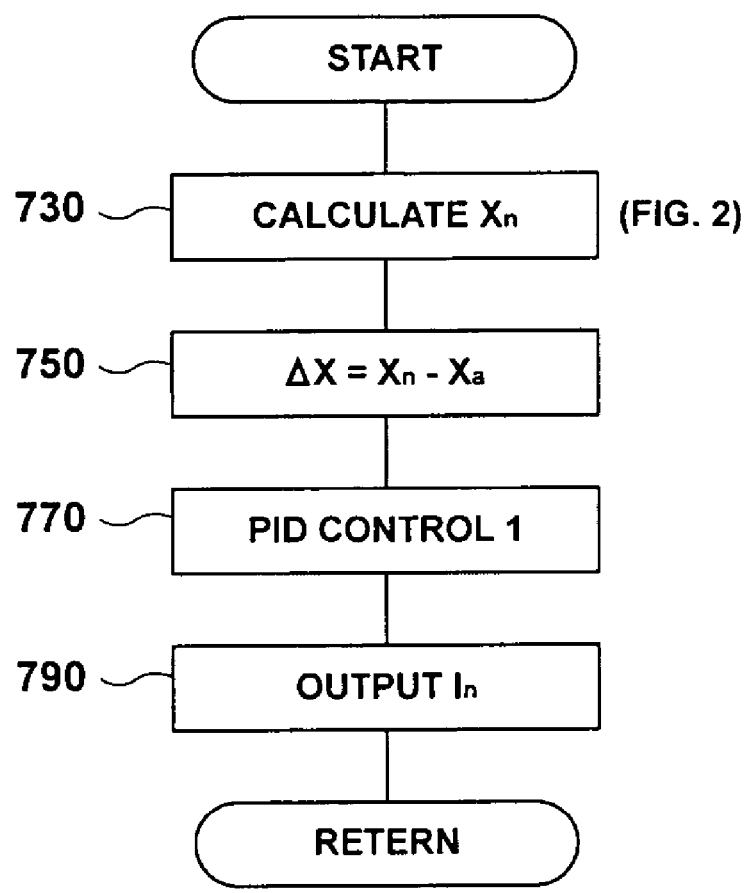
FIG. 7 is a flow chart showing a control procedure of a vehicle wheel steering motor control of the steering control device 300.

FIG. 7 illustrates a control procedure for the vehicle wheel steering motor control (630).

In step S730 of this sub-routine, the steering change amount command value $X_n$ is derived based on the map (table data) of FIG. 2. It should be noted that although the map of FIG. 2 is expressed by a linear expression, the command value $X_n$ for the steering angle θ may take the form of a quadratic expression for the steering angle θ. For example, by setting the command value $X_n$ such that it is symmetrical with the origin which is nearly equivalent to Equation 2, it is possible to configure. the steering control device 300 such that steering responsiveness is comparatively reduced as the handle 1 approaches the straight-ahead position. Note that respective coefficients $a_1$ and $a_2$ below are suitably adjusted constants.

$$dX_n/d\theta = a_1 + a_2|\theta| \qquad \text{(Equation 2)}$$

In step S750, a deviation $\Delta X$ (=$X_n - X_a$) of the steering change amount command value $X_n$ and the detected value $X_a$ is derived, based on the execution results of steps S620 and S730.

In step S770, a predetermined proportional plus integral plus derivative control 1 (hereinafter referred to as a "PID control 1") related to this deviation $\Delta X$ is executed.

Hereinafter, this PID control 1 will be explained.

(The PID Control 1)

The PID control 1 calculates a current command value $I_n$ for the vehicle wheel steering motor 6 in accordance with Equation 3, which is known. Note that respective coefficients $b_1$, $b_2$ and $b_3$ below are suitably adjusted constants.

$$I_n = b_1 \Delta X + b_2 \int \Delta X dt + b_3 d(\Delta X)/dt \qquad \text{(Equation 3)}$$

In the next step S790, the current command value $I_n$ calculated by the PID control 1 is output to the vehicle wheel steering motor drive circuit, not shown, and the reaction force control portion 5.

Once the above described vehicle wheel steering motor control is completed, the control returns to the sub-routine call start point (FIG. 6).

Next, in step S640 of FIG. 6, a sub-routine (FIG. 8) that executes a reaction force motor control is called and executed. This sub-routine is a sub-routine that simultaneously embodies the reaction force control portion 5 and the end reaction force control portion 21 (the end-of-movement reaction force generation unit).

Figure 8:
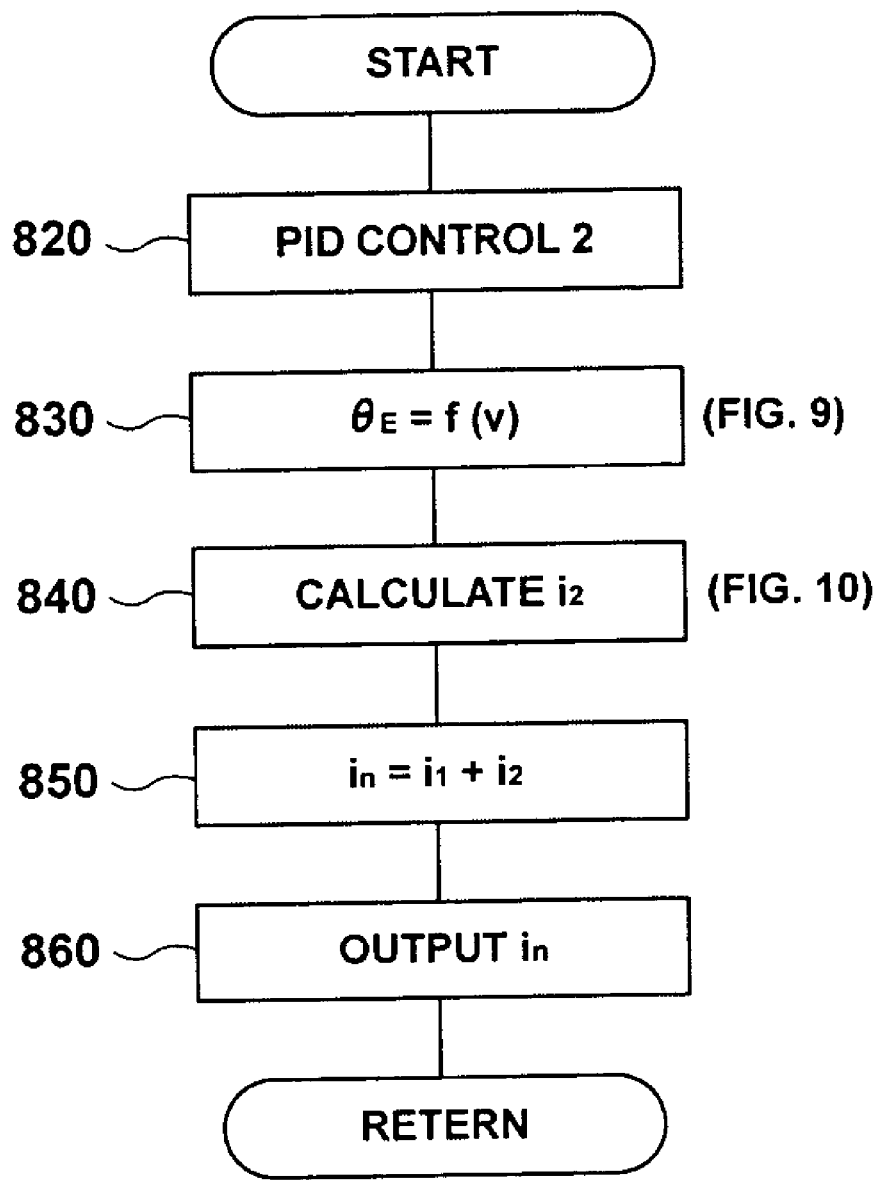
FIG. 8 is a flow chart showing a control procedure of a reaction force motor control of the steering control device 300.

FIG. 8 illustrates a control procedure for this reaction force motor control (640). In this sub-routine, first, in step S820, a predetermined proportional plus integral plus derivative control 2 (hereinafter referred to as a "PID control 2") is executed.

Hereinafter, this PID control 2 will be explained.

(The PID Control 2)

The PID control 2 calculates a current command value $I_1$, which is the conventional command value amount, for the reaction force motor 4 of FIG. 5 in accordance with Equation 4. Note that respective coefficients $c_1$, $c_2$, $c_3$, $c_4$, $c_5$ and $c_6$ below are suitably adjusted constants.

$$i_1 = -c_1\tau - c_2\int\tau dt - c_3 d\tau/dt - c_4 I_n - c_5\int I_n dt - c_6 dI_n/dt \qquad \text{(Equation 4)}$$

The current command value $I_1$, namely, the conventional amount for the reaction force motor 4, is calculated by the PID control 2 above.

Following this, in step S830, an upper limit value $\theta_E$ for the permissible range of the steering angle θ is determined using an appropriate function f that is attained based on a map (table data). Note that, here, the function f is a function which determines the upper limit value $\theta_E$ of the steering angle θ based on the vehicle speed v input in step S620. For example, the function f can be attained based on a map (a steering angle threshold value variation unit) like that illustrated in FIG. 9.

$$\theta_E = f(v) \qquad \text{(Equation 5)}$$

Figure 9:
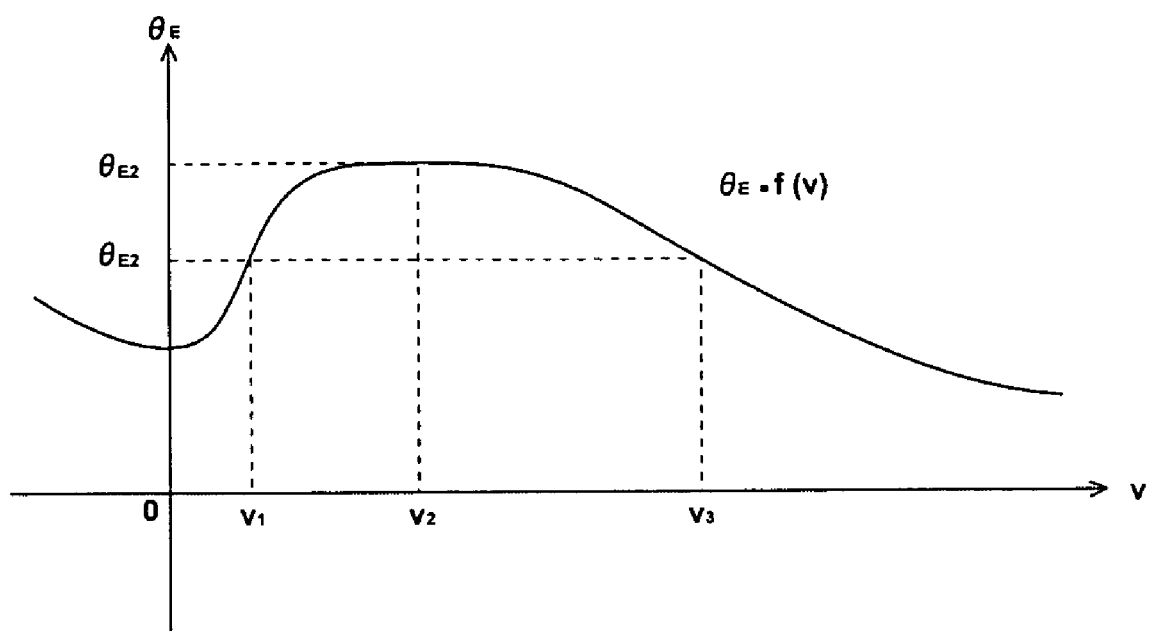
FIG. 9 a graph illustrating a threshold setting method of a steering angle threshold value variation unit of the steering control device 300.

More specifically, threshold values ($\pm\theta_E$) that correspond to upper and lower limits of the steering angle θ can be set so as dynamically change in accordance with the vehicle speed v, or the like, using an appropriate function, in the same manner as FIG. 9 or Equation 5.

The steering angle $\theta_E$ (>0) can be set (optimized) as chosen so as to be within a range in which there is no possibility that the aforementioned heat build-up problem of the vehicle wheel steering motor 6 will occur or become apparent.

Figure 10:
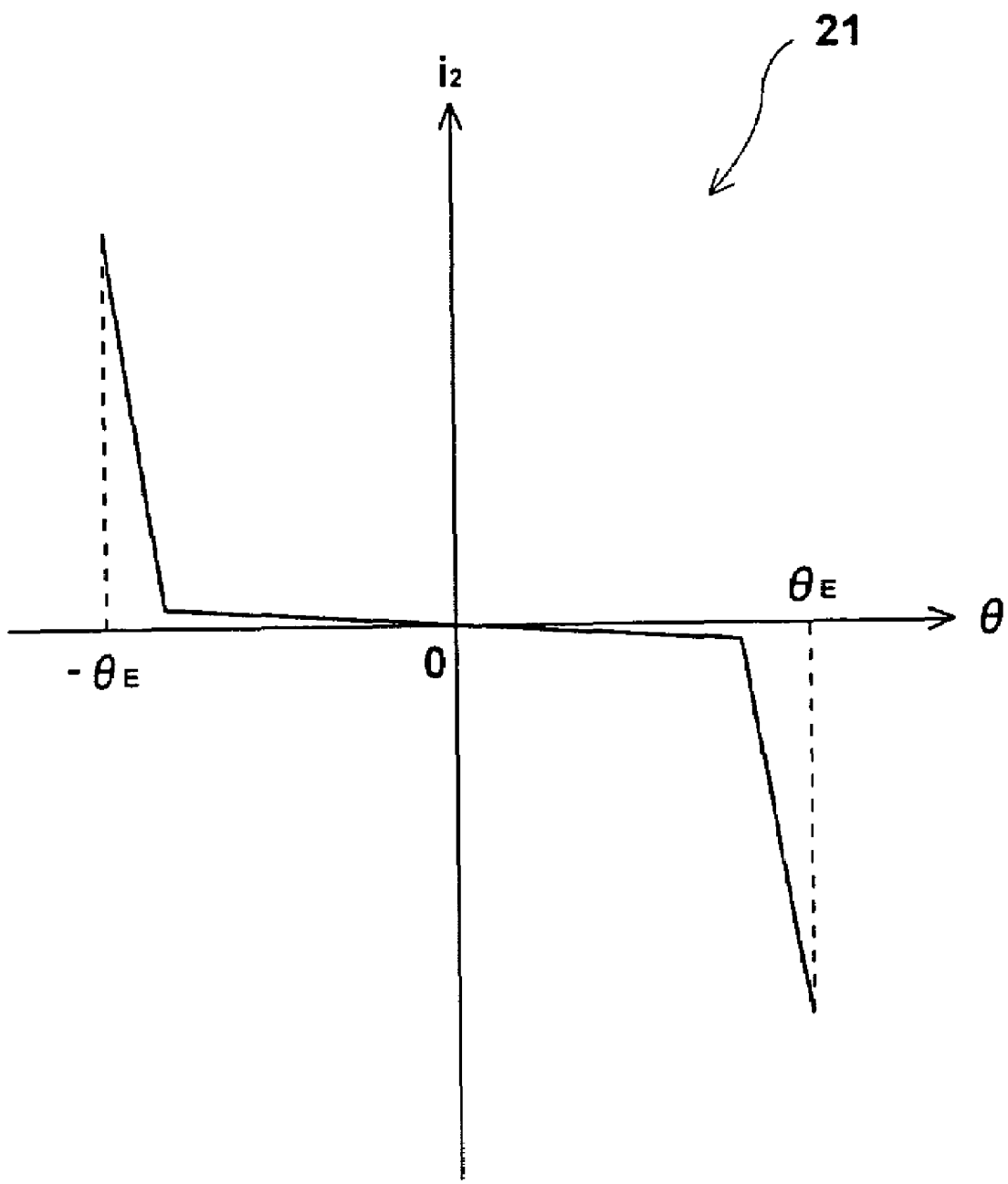
FIG. 10 is a graph illustrating a calculation method of an end reaction force generating current $i_2$ of an end-of-movement reaction force generation unit (an end reaction force control portion 21) of the steering control device 300.

Next, in step S840, the end reaction force generating current $i_2$ (the command current from the end-of-movement reaction force generation unit) is determined based on a map (table data) like that illustrated, for example, in FIG. 10. More specifically, FIG. 10 is a graph illustrating a calculation method of the end reaction force generating current $i_2$ of the end-of-movement reaction force generation unit (the end reaction force control portion 21) of the steering control device 300. The value of the current $i_2$ increases and decreases steeply in the region of the predetermined threshold values ($\pm\theta_E$). As a result of setting the current command (the end reaction force generating current $i_2$) in this manner, for example, regardless of whether the vehicle wheel steering position is near to the end, it is possible to simulate a contact point (an end-of-movement) for a chosen steering angle θ.

Moreover, FIG. 10 illustrates an example of linear setting, in which the current $i_2$ has a steep increase and decrease portion. However, instead of this, the current $i_2$ may have a curved shape. For example, a quadratic function, a tertiary function, a quaternary function, or the like, may be used so as to define the current $i_2$ in a curved manner. Moreover, an optimal contact feeling may be realized using an appropriate map (table data) and interpolation processing.

In step S850 of FIG. 8, the current command value $i_n$ for the reaction force motor 4 is determined in accordance with aforementioned Equation 1, as was the case for the first embodiment.

Moreover, in the next step S860, the current command value $i_n$ calculated as above is output to the reaction force motor drive circuit, not shown.

Once the above described reaction force motor control is completed, the control returns to the sub-routine call start point (FIG. 6).

Moreover, in step S650 of FIG. 6, finally, in order to periodically (for example, with a 0.5 ms period) execute the processing that follows on from step S620, pre-set timer interrupt processing, and the like, is executed, and the timer interrupt is placed in a waiting state.

Through adoption of the above described control procedure related to steering control, virtual contact resistance force (the steering reaction force) is generated. Accordingly, it is possible to restrict the range of steering angle without causing heat build-up of the motor, and the like, when no physical limit (the end-of-movement or contact point) is provided for the rotation range of the handle 1.

Moreover, through adoption of settings like that illustrated in FIG. 9, if, for example, the steering angle range is restricted to a small range, and the gear ratio (i.e., the vehicle wheel steering amount divided by the handle steering amount) is set to be small during high speed running, excessive or sudden steering is inhibited in advance at high speeds. Accordingly, it is possible to realize a steering feeling that imparts a sense of ease to the driver in a stable manner. In addition, when executing steering operations such as parking in a parking lot or garage, or the like, that tend to be executed at very low speeds, if the steering angle range is restricted to a small range, and the ratio of the handle steering amount with respect to the vehicle wheel steering amount is set to be large, it is possible to achieve a large degree of vehicle wheel steering with a small steering operation. Accordingly, for example, this type of method is highly beneficial for reducing, etc., the steering (handle) operation amount when parking, or the like.

In addition, a vehicle wheel steering limiter may be configured from a steering angle limiter which includes the threshold values for the steering angle θ (detected value) are exceeded. If this type of limiter for the detected valve is installed, for example, directly in front of the position control portion 10B, it is no longer necessary to use the limiter of FIG. 2 (i.e., the steering change amount command value calculation portion 11B) instead of the steering change amount command value calculation portion 11A of FIG. 13.

Alternatively, the vehicle wheel steering limiter may be entirely omitted from the above configuration, since the steering angle θ is limited spontaneously due to the operation of the command current (the end reaction force generating current $i_2$) of the end-of-movement reaction force generation unit. Accordingly, as long as the end-of-movement reaction force generation unit that generates the command current $i_2$ is provided, it is not essential to incorporate the vehicle wheel steering limiter. In other words, the aforementioned vehicle wheel steering limiter can be regarded as performing a fail safe operation for when a forcible steering operation is executed that is more than sufficient to cancel out the end-of-movement reaction force generated by the command current $i_2$.

Third Embodiment

A third embodiment has the structure of the previously described second embodiment with a number of portional modifications. Hereinafter, a concrete explanation will be given of other structural members (i.e., a steering change amount command value calculation portion 11C) related to the steering change amount command value calculation portion 11B of the steering control device 300.

Figure 11:
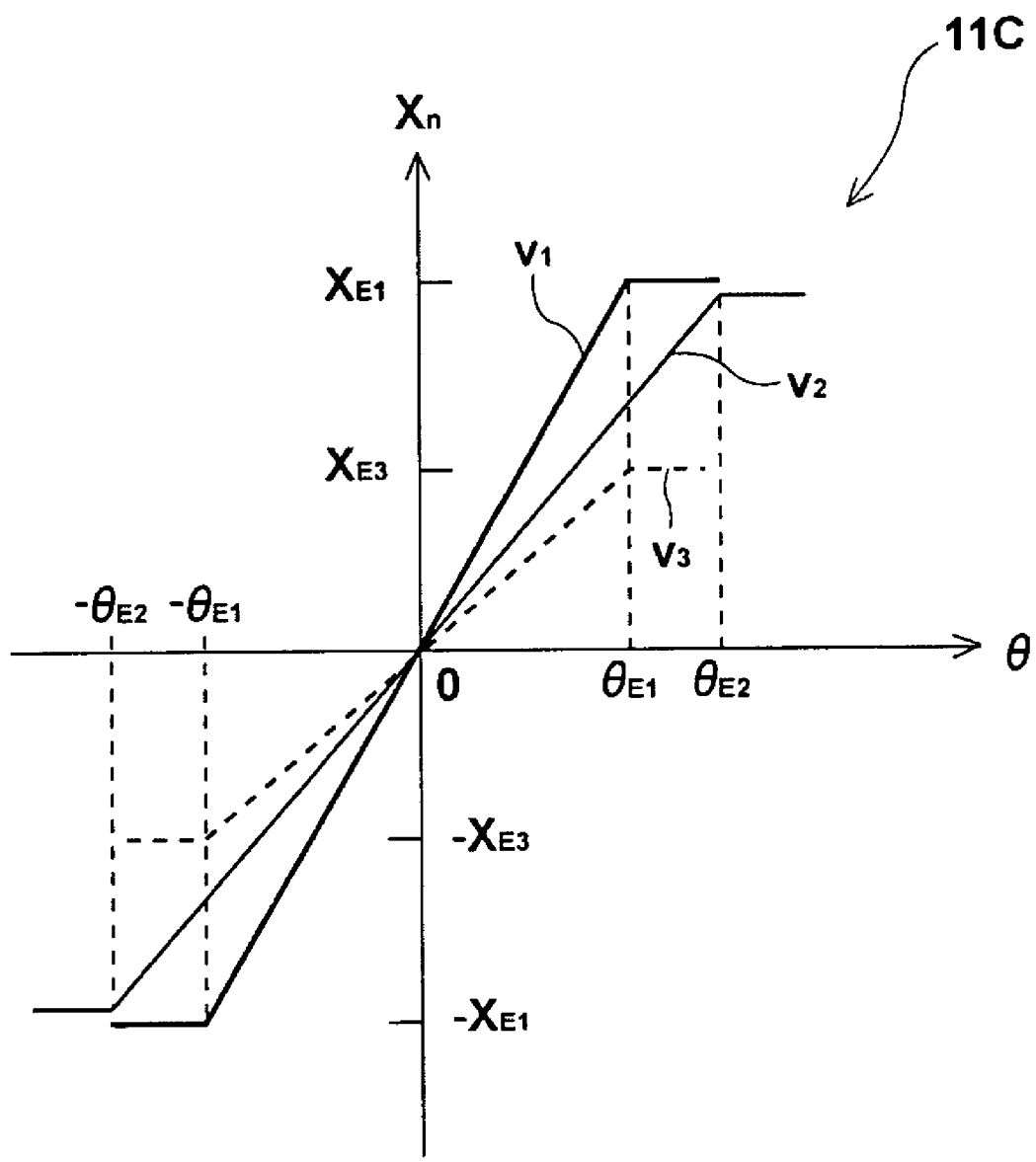
FIG. 11 is a graph illustrating a calculation method of a steering change amount command value calculation portion 11C according to a third embodiment of the present invention.

FIG. 11 illustrates a calculation method of the steering change amount command value calculation portion 11C according to the third embodiment. The vertical axis divisions $X_{E1}$ and $X_{E3}$ indicate the upper limit value ($X_E$) of the permissible range of respective steering change amounts corresponding to vehicle speed $v_1$ and $v_3$ of FIG. 9. More specifically, even in the case that the steering angle θ changes significantly, the steering control amount command value $X_n$ does not exceed the upper limits ($X_{E1}$, $X_{E3}$) at the respective vehicle speeds. Moreover, with the third embodiment, the upper limit ($X_{E2}$) of the permissible range of the steering change amount corresponding to the vehicle speed $v_2$ of FIG. 9 is set to have substantially the same value as the upper limit $X_{E1}$ of the permissible range of the steering change amount for the vehicle speed $v_1$.

As a result of this type of setting, for example, it is possible to easily configure (simulate) a variable gear ratio system. For example, if, as in the case of the setting for high speeds ($v_3$) of FIG. 11, the steering wheel angle range is restricted to a small range, and the gear ratio is set to be small, vehicle wheel shaft steering is comparatively unresponsive to handle steering. As a result, it is possible to realize a stable steering feeling. Moreover, for example, by dynamically restricting the wheel shaft steering range within a small range, as with the setting for high speeds ($v_3$) of FIG. 11, it is possible to ensure that vehicle behavior that accompanies the execution of steering operations when driving at high speeds is safe and stable.

In addition, when executing steering operations such as parking in a parking lot or garage, or the like, that tend to be executed at very low speeds, it is possible to achieve a large degree of vehicle wheel steering with a small steering (handle) operation, by restricting the steering angle range to a small range, and setting the ratio of the vehicle wheel steering amount with respect to the handle steering amount to be large. Accordingly, for example, this type of method is highly beneficial for reducing, etc., the steering (handle) operation amount when parking, or the like.

Moreover, the end-of-movement reaction force generation units (the end reaction force control portion 20 and the end reaction force control portion 21) of the previously described embodiments may be provided as an internal module within the reaction force control portion 5, or as an external function or local function, or the like, that can be utilized by the reaction force control portion 5.

Furthermore, the aforementioned embodiments illustrated examples of configuration using a steer-by-wire (SBW) system. However, the present invention can be applied, for example, to a steering control device in which a steering wheel steering mechanism and a vehicle wheel steering mechanism are operationally linked in a mechanical manner, such as a variable gear ratio steering (VGRS) system, or the like, which has a mechanical structure.

The principles, preferred embodiment and mode of operation of the present invention have been described in the foregoing specification and drawings. However, the invention which is intended to be protected is not to be construed as limited to the particular embodiment disclosed. Further, the embodiment described herein is to be regarded as illustrative rather than restrictive. The plural objectives are achieved by the present invention, and yet there is usefulness in the present invention as far as one of the objectives are achieved. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A steering control device including a steering wheel steering mechanism having a steering actuator that imparts a steering reaction force to a steering wheel, and a vehicle wheel steering mechanism having a vehicle wheel steering actuator that drives a vehicle wheel steering shaft, comprising:

a steering angle sensor that detects a steering angle θ of the steering wheel; and a steering change amount sensor that detects a steering change amount $X_a$ in the vehicle wheel steering mechanism;

an end-of-movement reaction force generation unit that respectively generates, in a vicinity of an upper limit point $\theta_E$ of the steering angle θ and a vicinity of a lower limit point $-\theta_E$ of the steering angle θ, a virtual contact resistance force that inhibits the steering angle θ from exceeding threshold values of a predetermined permissible range ($-\theta_E \leq \theta \leq \theta_E$) of the steering angle θ, based on the steering angle θ, the steering change amount $X_a$ or a command value $X_n$ for the steering change amount $X_a$; and a steering angle threshold value variation unit that dynamically changes the upper limit point $θ_E$ and the lower limit point $-θ_E$ of the permissible range $(-θ_E ≦ θ ≦ θ_E)$, based on a vehicle speed v.

2. The steering control device according to claim 1, wherein the steering wheel steering mechanism and the vehicle wheel steering mechanism are mechanically separate.

3. A steering control device including a steering wheel steering mechanism having a steering wheel steering actuator that imparts a steering reaction force to a steering wheel, and a vehicle wheel steering mechanism having a vehicle wheel steering actuator that drives a vehicle wheel steering shaft, comprising:

a steering angle sensor that detects a steering angle θ of the steering wheel; and a steering change amount sensor that detects a steering change amount $X_a$ in the vehicle wheel steering mechanism;

position control means for generating a command value $I_n$ for the vehicle wheel steering actuator based on the detected steering change amount $X_a$ and the detected steering angle θ of the steering wheel;

reaction force control means for generating a reaction force signal $i_n$ to the steering wheel steering actuator based on the command value $I_n$; and an end-of-movement reaction force generation means for generating, in a vicinity of an upper limit point $θ_E$ of the steering angle θ and a vicinity of a lower limit point $-θ_E$ of the steering angle θ, a virtual contact resistance force signal, wherein the steering wheel steering actuator imparts a steering reaction force to the steering wheel based on the sum of the reaction force signal and the virtual contact resistance force signal.

4. The steering control device according to claim 3, wherein the virtual contact resistance force signal is based on the detected steering angle θ.

5. The steering control device according to claim 3, wherein the virtual contact resistance force signal is based on the detected steering change amount $X_a$.

6. The steering control device according to claim 3, wherein the steering wheel steering mechanism and the vehicle wheel steering mechanism are mechanically separate.

* * * * *